Patented Dec. 19, 1950

2,534,713

UNITED STATES PATENT OFFICE 2,534,713

ASPHALT WETTING AGENTS

Elinor M. Hankins, Keyport, N. J., assignor to Standard Oil Development Company, a corporation of Delaware No Drawing. Application December 31, 1948, Serial No. 68,751

17 Claims. (Cl. 106—273)

This invention relates to new compounds and to methods for their preparation. These new compounds are useful as additives to bituminous materials, specifically for use as aids in improving the adherence qualities of asphalt to various types of rock aggregates.

There have long existed certain problems which occur when asphalt is added to certain rock aggregates for road surfacing compositions and other uses. In some cases and particularly where there is an appreciable moisture content of the rock, there is a reduced adherence of the asphalt to the rock which it is often necessary to improve in some manner before the rock can be used in surfacing and road building. The trade has found in the past that such improvement can be obtained by the addition of various types of materials to the asphalt, at least some of which function with a kind of specific wetting agent action to give much improved adherence of the asphalt to the wet rock.

One class of compounds which has been found to be highly useful for obtaining this kind of anti-stripping action are certain of the higher molecular weight amines and salts of the amines and various acids. In general, amines of the primary type have been found to be most effective for this purpose. The treatment with these additives has been found in some cases to be somewhat selective in its activity; for instance, on many types of basic rock aggregate, for example, limestone, an amine treated asphalt does not exhibit the required high resistance to stripping by water, thereby requiring the use of some other type of additives. In some cases, the salts of the amines are most satisfactory for this purpose.

However, in many cases the high molecular amines which are most effective as asphalt wetting agents are quite expensive and difficult to obtain, since they are commonly prepared from either the corresponding primary alcohols, or the corresponding halides which are made in turn from fatty oils or acids. Such steps are commonly necessary to obtain the high molecular weight amines and their salts. Such a sequence of reactions requiring expensive intermediates is likely to be very tedious and uneconomical for commercial production of agents to be used in road surfacing and the like.

A new and very useful series of amines and amines salts has been discovered which are highly suited for use as anti-stripping agents in all types of asphalt compositions. According to this invention, very effective anti-stripping agents can be prepared by condensing amines, especially ethylene diamine or other polyalkylene polyamines, with a halogen derivative of a polycyclopentadiene, such as di-, tri-, or tetra-cyclopentadiene. Halogen derivatives especially preferred for use are those in which the halogen atom occupies a primary position in the molecule. Thus, for instance, the said halogen derivates may be condensed with ammonia or a polyalkylene polyamine such as ethylene diamine, diethylene triamine, triethylene tetramine, and various others, as well as mixtures thereof. In general, it has been found that, while ammonia gives satisfactory products, the polyalkylene polyamines yield superior anti-stripping products when condensed with the polycyclopentadiene halide derivatives.

It should be understood that wherever the term "condensation product" appears in the specification, it is intended to mean the free amine base obtained by condensing the halide with an amine compound. As is well known, the initial product obtained by such a direct condensation will be an amine hydrohalide salt. It is a common chemical expediency to treat the reaction mixture directly with a strong base such as sodium hydroxide and thereafter isolate the free amine base.

The polycyclopentadienes, and especially those of the di, tri, and tetra type, have been extensively investigated in connection with other types of chemical compounds and reactions and are becoming more and more available for industrial uses. They are readily obtainable by controlled polymerization of cyclopentadiene, can be condensed with halogen acids, that is, hydrogen chloride or hydrogen bromide to give a corresponding monohalide. This addition reaction is quite well known and proceeds very well. In this case, the product contains the halogen atom attached directly to the polycyclopentadiene nucleus. This gives a useful intermediate of the halide type which may now be further reacted with ammonia or polyalkylene polyamines to give a series of compounds included in this invention.

Other methods may also be used to obtain a halide intermediate from the polycyclopentadiene for further condensation with the ammonia or polyalkylene polyamine. For example, as described in U. S. Patent 2,394,582, the di-, tri-, or tetra-cyclopentadiene may be reacted with alkylene chlorohydrins, such as ethylene chlorohydrin, to yield as product a chloroalkyl dihydropolycyclopentadienyl ether. In this case, the halogen atom is not attached directly to the polycyclopentadiene but is attached to a side chain of the nucleus. The two reagents in the presence of small quantities of strong mineral acid, such as sulfuric acid, readily yield the desired product.

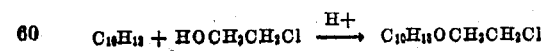

Obviously other methods for obtaining the polycyclopentadiene halide derivatives will be suggested to one skilled in the art. Although it is not intended to limit the preparation of these new additives to any one process, it has been found that one very good method is by treating halides containing the polycyclopentadiene residue with ammonia or a polyamine to produce, as the initial product, the corresponding amine or polyamine hydrochloride. Upon neutralization of this hydrohalide salt with an equivalent or slight excess of alkali, the free bases are released. These free bases are generally oily materials which may be used as such for incorporation into the asphalt compositions without any further purification. They need only be employed in small percentages relative to the total amount of asphalt composition and when used thus impart high resistance against stripping to bituminous materials, an amount of less than 2% based on the total bituminous material being quite sufficient in every case thus tested.

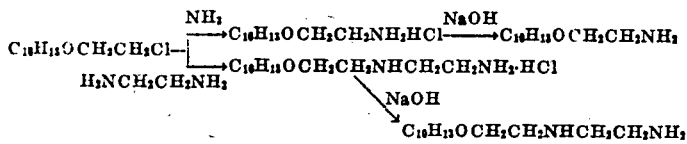

For alkaline rock aggregates and such types as do not respond well to basic additives, it is advantageous to form a salt of the amine by addition of an equivalent amount of acid. Acids of various types may be used for such purpose. For example, the amine condensation product may be employed as the hydrohalide salt, such as the amine hydrochloride or amine hydrobromide just as it first forms during the reaction or other salt products may be preferred, and may be prepared by treating the free amine with carboxylic acids, particularly those of the high molecular weight fatty acid type as oleic, linoleic, and linolenic acids or sulfonic acid salts may be used such as those derived from benzene, toluene, and xylene sulfonic acids. Various sulfonic acids obtained as byproducts in acid treating of petroleum distillates may also be used. Mixtures of acids commercially available such as tall oil may also be practical to use.

The reactions to produce these excellent additive compounds are quite simple to carry out and do not require either special apparatus, critical control, or special operational technique. Temperatures of the order of 100°–150° C. are satisfactory for operating the process of condensing the polycyclopentadiene with the ammonia or a polyalkylene polyamine. Such temperatures give a sufficiently rapid reaction rate. An inert solvent may be used if desired but it is not necessary in most cases and frequently best results are obtained by heating the reactants together without solvent for the period of time required to give reasonably complete reaction.

In the stripping test, results of which are reported below, the asphalt compositions were tested on New Jersey traprock containing 2% water. The final rock-asphalt mixture consisted of 6% rapid curing asphalt cutback type 2, and 94% of the wet rock aggregate.

The invention will be described in more complete detail by the following examples. All parts are by weight.

EXAMPLE 1

*Preparation of dicyclopentenoxyethyl-ethylenediamine*

The intermediate, β-cyclopentenoxy-ethyl chloride, was prepared as described in U. S. Patent 2,394,582 by condensing together dicyclopentadiene and ethylene chlorohydrin in the presence of a strong mineral acid, such as sulfuric acid.

$$C_{10}H_{12} + HOCH_2CH_2Cl \rightarrow C_{10}H_{13}OCH_2CH_2Cl$$

About 65 parts of the β-cyclopentenoxyethyl chloride and about 55 parts of ethylene diamine were mixed and heated together at temperatures ranging from 120°–140° C. for a period of time sufficient for the condensation reaction to go substantially to completion to form the ethylene diamine derivative of the chloride.

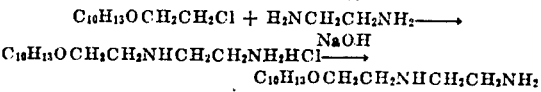

In addition to the mono-substituted ethylene diamine derivative indicated above, polysubstituted diamine or polyamine derivatives are also unquestionably obtained. Under proper reaction conditions, however, the mono-substituted derivatives may predominate. Both mono- and polysubstituted products as well as mixtures are useful as additives.

After completion of the reaction, the resulting product was diluted with water and treated with at least an equivalent amount of sodium hydroxide to neutralize the hydrochloric acid formed by the reaction. The former is, of course, initially present as the hydrochloride salt of the desired amine product. The free organic amine product was extracted from the aqueous mixture with ethyl ether and the ethereal layer dried. After evaporation of the ether solvent, there remained a light yellow-colored oil. This oil was tested as an additive for bituminous products without further purification and was found to give very superior results as an asphalt addition agent for increasing the adhesion of the asphalt to damp rock aggregate. The results of such testing are shown in Table I below in which the free dicyclopentenoxyethyl-ethylene diamine is designated as Product "A."

The oleic acid salt of Product A was also prepared by adding to the amine an equivalent amount of oleic acid. This salt is shown as Product "B" in Table I, in which results are reported indicating the oleic acid salt to be a very good anti-stripping agent for incorporation into asphalt compositions.

TABLE I

| | Percent Conc. in Asphalt | Mixing Ability | Resistance to Stripping, Traprock+2%Water | | |
|---|---|---|---|---|---|
| | | | 0 Hr. | 1 Hr. | 2 Hrs. |
| Asphalt | | 90 | 5 | 10 | 20 |
| Product A (free base) | 2.0 | 100 | 90 | 100 | 100 |
| | 1.0 | 95+ | 50 | 90 | 100 |
| | 0.5 | 95 | 5 | 30 | 95 |
| Product B (oleic acid salt) | 2.0 | 100 | 85 | 95+ | 100 |
| | 1.0 | 95+ | 10 | 100 | 100 |
| | 0.5 | 95 | 5 | 50 | 100 |
| | 0.25 | 90+ | 5 | 45 | 85 |

The results reported in the table represent the percentages of the rock aggregate coated by the asphalt after indicated time of cure. A 75 per cent coverage after one hour cure time is generally regarded as satisfactory in such tests.

EXAMPLE 2

*Preparation of tricyclopentenoxyethyl-ethylenediamine*

The intermediate, β - tricyclopentenoxyethyl chloride, required for this additive was prepared in a manner completely analogous to that employed for preparing the intermediate of Example 1 by starting with tricyclopentadiene.

About 30 parts of tricyclopentenoxyethyl chloride was reacted with about 18 parts of ethylenediamine by heating the mixture together at temperatures of 140°–150° C. until the condensation was substantially complete. The reaction mixture was then poured into water and there was added an amount of sodium hydroxide slightly in excess of that necessary to neutralize the hydrogen halide formed by the reaction. The oil product consisting of the free amine was extracted with ether, dried, and evaluated as an asphalt addition agent without any other purification. The free base thus obtained is designated as Product "C" and the results which are obtained by its use as an addition agent are shown in Table II.

The tall oil salt of the tricyclopentenoxyethyl ethylenediamine, whose preparation is described above, was prepared by mixing equimolar proportions of the base and the acid. This product was likewise tested as an anti-stripping action for use in asphalt compositions. It is designated as Product "D" and the results obtained in testing it are shown in Table II. That the product is highly effective as an asphalt addition agent may be seen from the data of Table II.

TABLE II

| | Percent Conc. in Asphalt | Mixing Ability | Resistance to Stripping, Traprock+2% Water | | |
|---|---|---|---|---|---|
| | | | 0 Hr. | 1 Hr. | 2 Hrs. |
| Product C (free base) | 2.0 | 100 | 95+ | 100 | 100 |
| | 1.0 | 100 | 45 | 100 | 100 |
| | 0.5 | 95 | 40 | 95+ | 95+ |
| | 0.25 | 95 | 10 | 40 | 50 |
| Product D (tall oil salt) | 2.0 | 100 | 100 | 100 | 100 |
| | 1.0 | 95 | 35 | 100 | 100 |
| | 0.5 | 90 | 5 | 80 | 100 |
| | 0.25 | 85 | 0 | 40 | 90 |

It is preferred that the additives of the present invention be used in a concentration in the range from about .25 to 2.0% by weight.

What is claimed is:

1. An improved bituminous bonding composition comprising a mixture of asphalt and at least one anti-stripping addition agent, present in a concentration from about .25 to 2.0% selected from the group consisting of a condensation product of a polyalkylene polyamine with a halogen derivative of a polycyclopentadiene and the salt products derived by treating said condensation products with acid, and mixtures thereof.

2. An improved bituminous bonding composition comprising a mixture of asphalt and at least one anti-stripping addition agent, present in a concentration from about .25 to 2.0% selected from the group consisting of a condensation product of a polyalkylene polyamine with a chlorine derivative of a polycyclopentadiene and the salt products derived by treating said condensation products with acid, and mixtures thereof.

3. An improved bituminous bonding composition comprising a mixture of asphalt and a condensation product, present in a concentration from about .25 to 2.0% obtained by reacting a polyalkylene polyamine with a halogen derivative of an alkyl substituted polycyclopentadiene in which the halogen atom is in the omega position on the alkyl side chain.

4. A composition such as that described in claim 3 in which the polyalkylene polyamine is ethylene diamine.

5. An improved bituminous bonding composition comprising a mixture of an asphalt and a salt derived by treating a condensation product of claim 3 with an acid.

6. A composition such as that described in claim 5 in which the polyalkylene polyamine is ethylene diamine.

7. An improved bituminous bonding composition comprising a mixture of asphalt and a condensation product, present in a concentration amount from about .25 to 2.0% obtained by reacting a polyalkylene polyamine with a halogen derivative of a polycyclopentadiene in which the halogen atom is attached to a pentadiene nucleus.

8. A composition such as that described in claim 7 in which the polyalkylene polyamine is ethylene diamine.

9. An improved bituminous bonding composition comprising a mixture of an asphalt and a salt derived by treating a condensation product of claim 7 with an acid.

10. A composition such as that described in claim 9 in which the polyalkylene polyamine is ethylene diamine.

11. An improved bituminous bonding composition comprising a mixture of asphalt and a condensation product, present in a concentration from about .25 to 2.0% obtained by reacting ethylene diamine with a halogen derivative of a dicyclopentadiene in which the halide is of the primary type.

12. An improved bituminous bonding composition comprising a mixture of asphalt and a salt derived by treating a condensation product of claim 11 with an acid.

13. An improved bituminous bonding composition comprising a mixture of asphalt and a condensation product, present in a concentration from about .25 to 2.0% obtained by reacting ethylene diamine with a halogen derivative of a tricyclopentadiene in which the halide is of the primary type.

14. An improved bituminous bonding composition comprising a mixture of asphalt and a salt derived by treating a condensation product of claim 13 with an acid.

15. The method of preparing an improved bituminous bonding material which comprises condensing dicyclopentadiene and ethylene chlorohydrin, treating the halogen containing product so obtained with a polyalkylene polyamine and blending from about .25 to 2.0% of the derivative thus obtained with asphalt.

16. The method of preparing an improved bituminous bonding material which comprises condensing tricyclopentadiene and ethylene chlorohydrin, treating the halogen containing product so obtained with a polyalkylene polyamine and blending from about .25 to 2.0% of the derivative thus obtained with asphalt.

17. An improved bituminous bonding composition comprising a mixture of asphalt and at least one anti-stripping addition agent present in a concentration from about .25 to 2.0% selected from the group of compounds having the formula $$(C_5xH_{6x+1})-O-(CH_2CH_2)_y-NH-(CH_2CH_2NH)_zCH_2CH_2NH_2$$

wherein $x$ represents a number from 2 to 4; $y$ represents a number from 1 to 3 and $z$ represents a number from 0 to 2.

ELINOR M. HANKINS.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,378,235 | Miles | June 12, 1945 |
| 2,461,971 | Fischer | Feb. 15, 1949 |

FOREIGN PATENTS

| Number | Country | Date |
|---|---|---|
| 560,716 | Great Britain | Apr. 18, 1944 |